April 8, 1930. T. G. MELISH 1,753,995
FLOUR SIFTER
Filed June 18, 1926
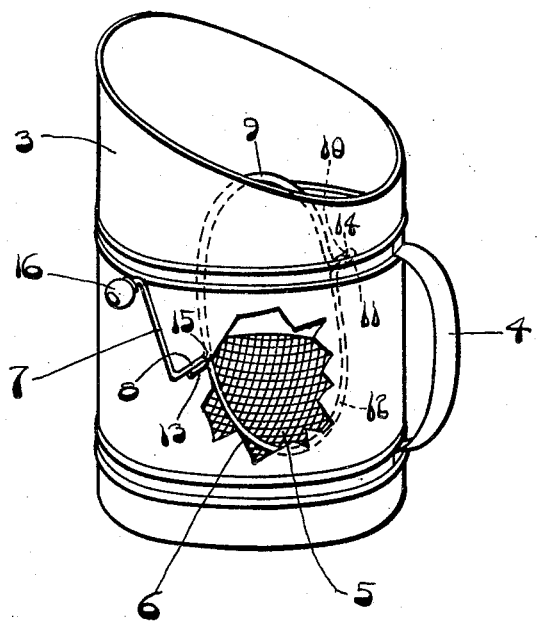
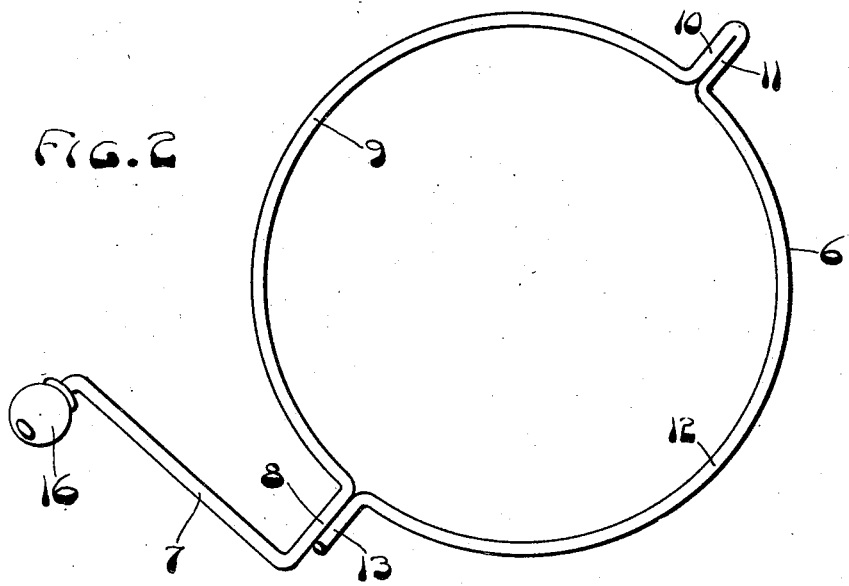
INVENTOR
Thomas G. Melish
BY Thornton Bogert
ATTORNEY Patented Apr. 8, 1930

1,753,995

UNITED STATES PATENT OFFICE

THOMAS G. MELISH, OF CINCINNATI, OHIO, ASSIGNOR TO THE BROMWELL WIRE GOODS COMPANY, OF CINCINNATI, OHIO, A CORPORATION OF DELAWARE

FLOUR SIFTER

Application filed June 18, 1926. Serial No. 116,905.

This invention is a development of the inventions disclosed in copending applications serially numbered 110,671 and 110,764 filed by Thomas G. Melish and Rogers M. Cox respectively, covering flour sifters, and is designed with an object to produce a construction of extreme simplicity necessitating a minimum of material and manufacturing operations, thereby reducing the cost of production and the consequent sale price without destroying the efficiency with which a flour sifter should function.

These and other objects are attained in the flour sifter described in the following specification and illustrated in the accompanying drawing in which:

Fig. 1 is a perspective view of a flour sifter embodying my invention.

Fig. 2 is a perspective view upon enlarged scale, of the agitator employed in the sifter shown in Fig. 1 and which embodies the feature of novelty of my invention.

The sifter which I have shown as a type to which my invention applies, is of the style which may be found about the kitchen of the average house and consists of a body 3 which is held by a handle 4, the top being open and the bottom consisting of a sifting screen 5, with an agitator 6 therein which is rotated by a crank 7 on the outside.

The agitator is so simple that a brief description will suffice. The crank 7 and the agitator 6 are formed as a unit and of a single piece of wire as shown in Fig. 2. First the crank 7 may be formed, with a short portion 8 at a right angle thereto to form a bearing. Then one circular or approximately circular wing 9 is formed to bring the wire to the diametrically opposite side of the agitator where a short portion 10 and a corresponding short portion 11 which is doubled back on the portion 10, form the bearing for the opposite side of the agitator. Following this the complementary wing 12 is formed and is terminated by a short portion 13 lying adjacent to and parallel with portion 8.

This agitator is then mounted for rotation in apertures 14 and 15 in the sifter body, after which a crank handle 16 may be placed on the crank. Thus, there is no element utilized to hold the agitator together or to render it rigid other than the bearing aperture 15 at the crank end, which holds portions 8 and 13 together and enables the agitator to be rotated as a rigid unit. With such a construction I have found no necessity to resort to binders, soldering, brazing, welding and similar schemes for the reason that sufficient stability is obtained as I have described.

Having thus described my invention what I claim is:

A sifter comprising a body having perforations in the opposite sides thereof, a screen in the body through which to sift the contents thereof, and an agitator in the body adjacent to and adapted to pass over the surface of the screen to promote passage of the body contents through the screen, said agitator consisting of a single piece of wire bent upon itself at approximately the middle of its length to form a journal to occupy one of the body perforations, each branch of the wire adjacent the journal being shaped to the screen and lying in the plane of its cooperating branch, the ends of the branches being bent to lie together loosely and to occupy the opposite body perforation, one of said ends terminating just beyond the perforation and the second end bent beyond the perforation to provide a crank whereby to rotate the agitator.

In testimony whereof I have hereunto affixed my signature.

THOMAS G. MELISH.